(12) United States Patent
Morman

(10) Patent No.: US 8,205,580 B2
(45) Date of Patent: Jun. 26, 2012

(54) PET WASTE CAPTURE DEVICE

(76) Inventor: Charles Morman, Buena Park, CA (US)

( * ) Notice: Subject to any disclaimer, the term of this patent is extended or adjusted under 35 U.S.C. 154(b) by 0 days.

(21) Appl. No.: 12/802,772

(22) Filed: Jun. 14, 2010

(65) Prior Publication Data

US 2011/0303162 A1    Dec. 15, 2011

(51) Int. Cl.
*A01K 23/00* (2006.01)

(52) U.S. Cl. ........................................ 119/868; 119/867

(58) Field of Classification Search ................ 119/867, 119/868, 869, 854, 161, 907, 850, 856; D30/152; 604/385.19
See application file for complete search history.

(56) References Cited

U.S. PATENT DOCUMENTS

| | | | | | |
|---|---|---|---|---|---|
| 4,444,152 | A | * | 4/1984 | Berardo | 119/868 |
| 5,355,836 | A | * | 10/1994 | Vallery | 119/868 |
| 5,386,802 | A | * | 2/1995 | Hang-Fu | 119/868 |
| 5,819,691 | A | * | 10/1998 | Lavi et al. | 119/868 |
| 5,937,795 | A | * | 8/1999 | Raphael | 119/869 |
| 6,394,041 | B1 | * | 5/2002 | Katz | 119/868 |
| 6,494,168 | B2 | * | 12/2002 | Weng | 119/868 |
| 6,837,187 | B2 | | 1/2005 | Berardo | |
| 7,574,980 | B2 | | 8/2009 | Bosio Blanco | |

* cited by examiner

*Primary Examiner* — T. Nguyen

(57) ABSTRACT

A pet waste capture device includes a harness and a collection container where the harness fits around the pet to secure the collection container in position. The harness may include straps and elastic bands to comfortably and securely fit to the pet. The collection container may be removable.

14 Claims, 3 Drawing Sheets

PET WASTE CAPTURE DEVICE

BACKGROUND

Many localities require that pet owners remove droppings their pets leave in public places. While many owners ignore the mandate, others use scoopers, gloves, or bags for this unpleasant task. There have been many attempts to improve this process including use of pet apparel products designed to interdict the offending material at its source. These attempts have generally been inconvenient for the user, expensive to use, uncomfortable for the pet, or simply so monstrously disgusting as to forestall any use of the products.

Three U.S. patents are exemplary of earlier designs. U.S. Pat. No. 6,837,187 for a Device for Collection of Animal Waste describes a relatively complex collection of chest strap, leg loops, leg braces and a collar loop, where the collection is intended to support a waste bag. The device requires the user to install and adjust straps individually around the animal's legs, body, and to a collar, a complex procedure that may be uncomfortable for the animal. The device includes straps disposed beneath an animal's anus, a position prone to contamination during use and one that requires the user to place his or her hands in a sensitive location. The patent describes that each of the straps may be made of an elastic textile material but does not identify the selective use of elastic materials for particular parts.

U.S. Pat. No. 4,444,152 for a Device for Collection of Animal Wastes describes a similar complex collection of straps by the same inventor as U.S. Pat. No. 6,837,187. The patent also includes straps encircling the animal's legs and running both above the tail and below the anus.

U.S. Pat. No. 7,574,980 for a Device with Disposable Bag for Collecting Animal Waste describes a relatively complex multi-component drawstring bag with a stiffening band adjacent the bag mouth. Hooks depending from elastic cords couple the bag to a harness that the patent does not describe.

SUMMARY

The invention includes a harness suitable for removably attaching a collection container to a pet and an inexpensive collection container for disposing of collected wastes. The harness holds the collection container proximate to the pet's anus so that any feces produced falls into the collection container. The user may then remove and discard the collection container, and, if desired, affix a new collection container to the harness.

The invention avoids many deficiencies of prior solutions by providing a simple harness including strong straps to firmly anchor the harness to the pet and flexible elastic bands that give the pet freedom of movement. Straps and bands cooperate to dispose the collection container near the animal's anus with the container mouth open. The collection container itself may be a simple and inexpensive bag formed of a single material.

BRIEF DESCRIPTION OF THE DRAWINGS

FIG. 2b is an expanded view of a portion of FIG. 2a.

DETAILED DESCRIPTION

Figure 1:
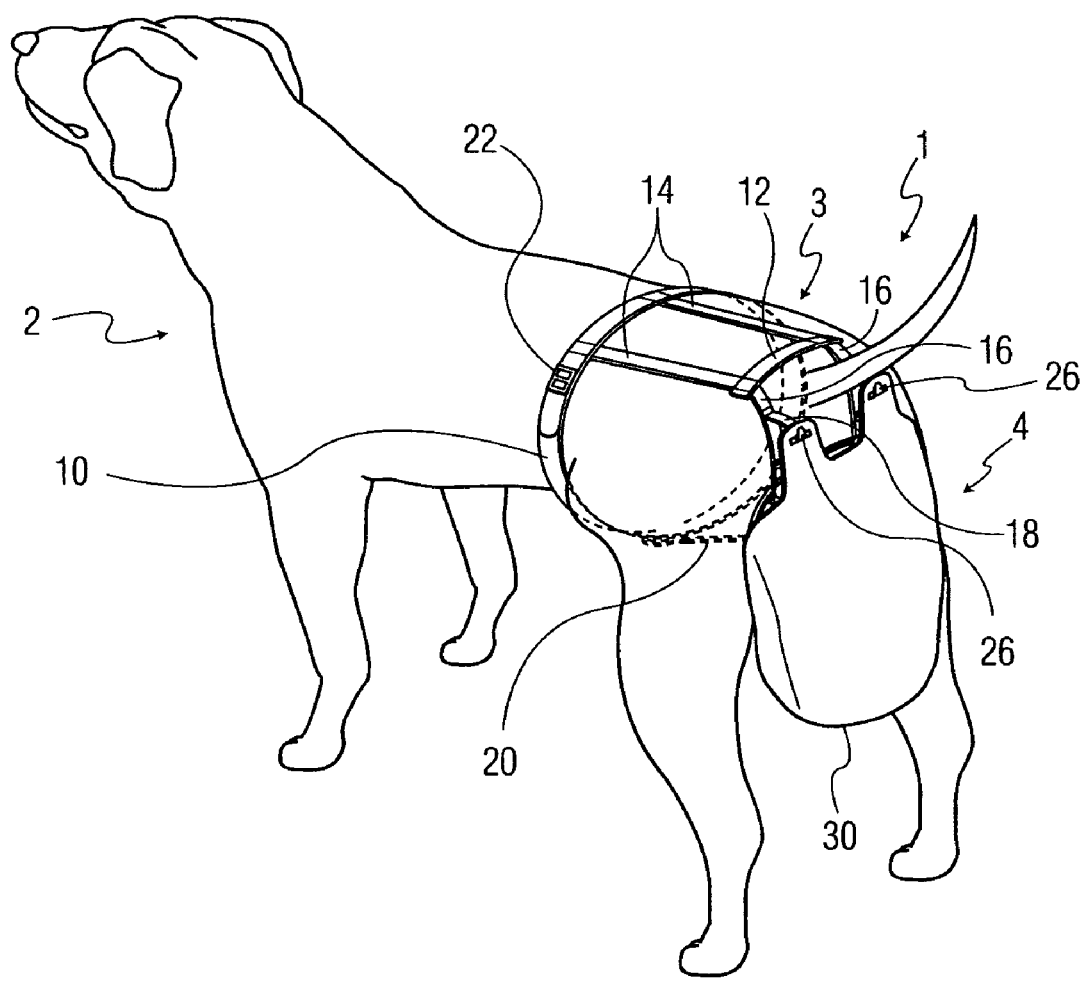
FIG. 1 illustrates a first embodiment of the harness and collection container of the invention shown disposed on a pet, here a dog.

While many types of pets, such as cats, ferrets, pigs, and the like, may benefit from the invention, the most common use of the invention is likely with dogs. Referring to FIG. 1, which illustrates one embodiment of the invention 1 disposed on a dog 2, harness 3 supports collection container 4 adjacent the dog's anus. Harness 3 includes abdominal strap 10 cinched around the dog's torso. Tail strap 12 is disposed above the animal's tail and connecting straps 14 connect tail strap 12 to abdominal strap 10. Descending straps 16 pass on either side of the tail; the upper end of each descending strap 16 connects to tail strap 12. Each descending strap 16 supports an attached spring strip 18, and spring strips 18 support collection container 4, shown in more detail in FIGS. 3 and 4. Elastic bands 20 route under each hind leg to connect to the lower aspect of abdominal strap 10.

Abdominal strap 10 forms the primary anchor of harness 3 to the pet. Its purpose is to firmly attach harness 3 in a simple manner that permits easy adjustment. Abdominal strap 10 may be formed of a variety of materials to provide strength and a secure fit. Preferably, abdominal strap 10 is formed polymer, leather, textile, or the like. More preferably, it is high strength strap webbing such as woven nylon webbing. Such webbing is relatively inexpensive, extremely durable, may be readily joined by several techniques, and is compatible with a variety of fasteners.

Abdominal strap 10 may form a closed loop to fit the pet, but this may make installation difficult. Preferably, abdominal strap 10 is open but includes at least one adjustable fastener 22. Adjustable fastener 22 closes the free ends of abdominal strap 10 and permits tightening or loosening as required. While adjustable fastener 22 on abdominal strap 10 may be in any position when installed on the pet, preferably, it is on the pet's back. This position has the benefits of easy adjustment for the user and difficulty for the pet to reach and possibly escape harness 3. Adjustable fastener 22 may be any of a number of fastening types such as buckles, slip-locks, cam fittings, Velcro® or the like. Preferably, adjustable fastener 22 is a slip-lock fastener.

Tail strap 12 is disposed above the animal's tail and oriented roughly parallel to abdominal strap 10. Connecting straps 14 serve to connect tail strap 12 to abdominal strap 10 and thereby position tail strap 12 above the animal's tail. The tail itself may serve as a convenient landmark for installation of harness 3. The harness 3 is correctly positioned when tail strap 12 is centered just above the animal's tail and when connecting straps 14 are taut. One function of the tail strap 12 is to position descending straps 15 so that they descend on either side of the tail.

Each descending strap 16 depends from at or near one end of tail strap 12. The function of descending straps 16 is to position retaining devices that hold collection container 4 proximate the animal's anus. Each descending strap 16 supports a spring strip 18. Preferably, tail strap 12, connecting straps 14, and descending straps 16 are of similar composition to abdominal strap 10.

Figure 2A:
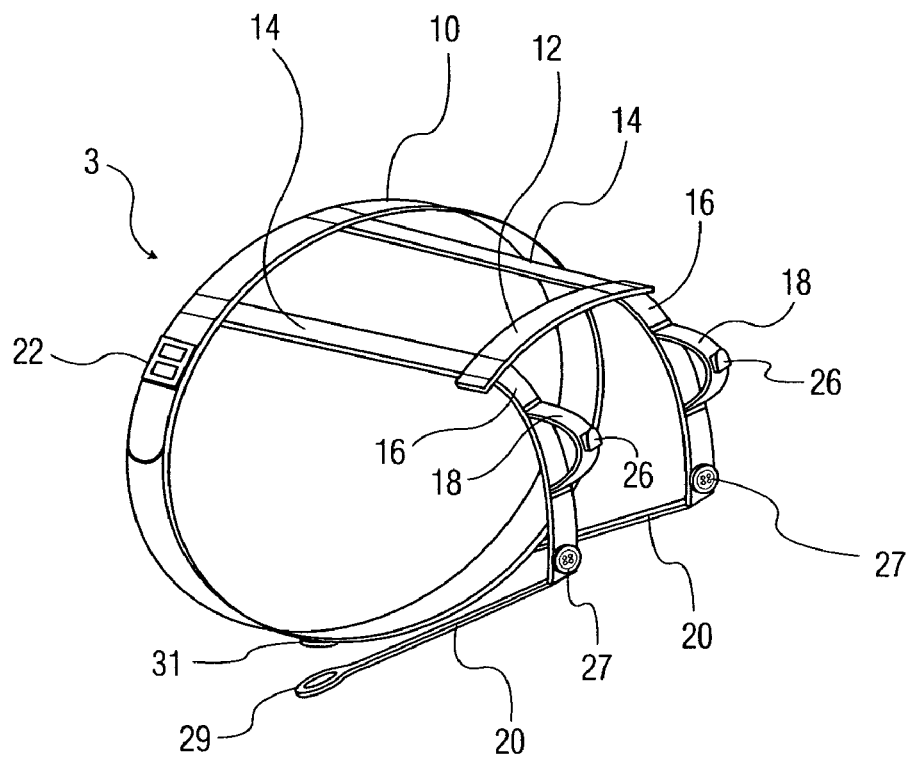
FIG. 2a illustrates the harness of the same embodiment as FIG. 1 without the dog or the collection container to more clearly show relationships among the parts.
Figure 2B:
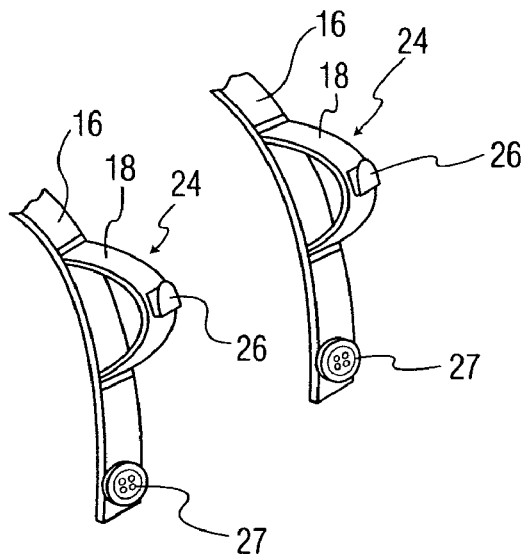

Spring strips 18, more readily visible in FIGS. 2a and 2b, are elongated segments of flexible springy material. Each spring strip 18 attaches near both its ends to separated positions on one of the descending straps 16. Each spring strip 18 is longer than the distance separating the two attachment positions so that the spring force of each spring strips 18 flexes against the constrained ends and forms a half loop 24. Each half loop 24 has a gap separating the body of each spring strip 18 from its attached descending strap 16. The region of each descending strap 16 between the attachment positions closes each half loop 24 so that the complete structure resembles a letter D with a curved portion and a straight portion bridging the ends of the curve.

Each half loop 24 may include one or more hooks 26 affixed to each spring strip 18. Preferably, each half loop 24 includes one hook 26 on each spring strip 18 near the midpoint of each spring strip 18. In some embodiments, each spring strip 18 includes two or more hooks 26, with hooks disposed near either end of each spring strip 18. Spring strips 18 thus keep the hooks 26 on each spring strip 18 separated from one another. The disposition of half loops 24 on opposite-side descending straps 16 keeps opposite-side hooks 26 separated. The net effect is that all hooks 26 are held distant from one another and on opposite sides of the animal's anus. The separated hooks cooperate to hold collection container 4 open when hooks 26 engage collection container 4. While spring strips 18 may be formed of any durable material of reasonable compliance, preferably, spring strips 18 are a springy polymer. Most preferably, spring strips 18 are polyethylene or polypropylene.

Hooks 26 may be of any type, but are preferably relatively flat bent wire hooks of the type commonly known as dress hooks. Such dress hooks are commercially available in a variety of sizes and include openings that permit stitching of the dress hooks to an underlying substrate. Dress hooks are particularly advantageous in this application because the free ends of the hooks are rounded, which reduces the possibility of injury or discomfort to the animal or of snagging and damaging the collection container 4. The relatively flat conformation of dress hooks helps to retain the collection container without obtruding very far into the opening of the collection container 4. This significantly reduces the risk that the hooks 26 will be contaminated.

In some embodiments, descending straps 16 extend beyond the end of half-loops 24 distal to tail strap 12. In these embodiments, each descending strap 16 may include one or more secondary fasteners 27. Secondary fasteners 27 may be affixed to each descending strap 16 in the region beyond the end of the half-loops 24 distal to tail strap 12.

Secondary fasteners 27 advantageously provide another pair of connection points to collection container 4 displaced spatially from hooks 26. The benefit of this spatial separation is that, when connected to the secondary fasteners, the collection container 4 may be held more completely open. Secondary fasteners 27 may be similar to hooks 26, but are preferably conventional buttons stitched to descending straps 16. The use of buttons as secondary fasteners 27 advantageously permits simple attachment of collection container 4 once collection container 4 is affixed to hooks 26. Buttons allow mouth 32 of collection container 4 to stretch between hooks 26 without a requirement to orient collection container 4 with respect to the buttons. Unlike hooks 26, which have a preferred orientation of fastening, a portion of the opening of collection container 4 may be retained beyond a button in any orientation.

Elastic bands 20 connect near the lower end of each descending strap 16 to abdominal strap 10 near the lowest point of abdominal strap 10. These may be viewed to best advantage in FIG. 2a, which shows elastic bands 20 before connection to abdominal strap 10. Each elastic band 20 connects to one of descending straps 16 and passes adjacent to the medial aspect of the animal's thigh on the same side of the animal as the descending strap 16 to which it connects. Preferably, neither elastic band 20 crosses the animal's midline. Elastic bands 20 advantageously allow for the animal's free motion. When an animal moves its hind legs to walk, run, sit, or lie down, the distance between abdominal strap 10 and descending strap 16 may change as individual muscles contract and relax. Other activities, such as breathing, squatting, or defecating can also change the relationship between locations on the animal. Elastic bands 20 of the invention stretch and recover in response to these changes. This stretching and recovery maintains the collection container in position without significantly inhibiting movement.

Without the connection of the descending straps 16 to abdominal strap 10, the collection chamber position might shift, making it ineffective. A non-elastic strap in this position might either limit the animal's motion (if too short), or bunch up allowing the collection container to shift (if too long). An intermediate length of non-elastic strap may do both. Most materials have some degree of elastic compliance. Elastic bands 20 of the invention may have significant elastic compliance, preferably stretching at least 20% of resting length, more preferably at least 50% of resting length, and most preferably at least 80% of resting length. Suitable materials for the elastic bands 20 include natural and synthetic rubbers and textiles containing stretchable fibers such as spandex.

In some embodiments, elastic bands 20 may be removably attached to abdominal strap 10. This may simplify installation of harness 3 onto an animal. Preferably, elastic bands 20 terminate in fastening loops 29 at the end designed for attachment to abdominal strap 10. Abdominal strap 10 may include band fasteners 31 that attach to fastening loops 29. Preferably, band fasteners 31 are conventional buttons stitched to abdominal strap 10. Fastening loops 29 slip around band fasteners 31 to hold elastic bands 20 to abdominal strap 10.

Other components, such as abdominal strap 10, connecting straps 14, tail strap 12, and descending straps 16 are preferably flexible and may be at least slightly elastic. These parts are preferably relatively non-elastic as compared to elastic bands 20. The relatively non-elastic straps, particularly descending straps 16, serve to position collection container 4 so as to avoid displacement during use. Use of descending straps 16 that have high elasticity risks movement of collection container 4. Preferably, descending straps 16 have elastic compliance of less than about 20% and more preferably, less than about 10%.

Relatively more stretchable elastic bands 20 serve both to bias descending straps 16 against the animal's posterior and to accommodate relatively large motion induced changes associated with leg movement. The stretchable elastic bands 20 further eases harness installation in embodiments including removable attachment of elastic bands 20 to abdominal strap 10.

The several straps and bands that make up harness 3 may connect to one another by any of a variety of methods including interweaving, use of adhesives, use of fasteners such as staples, rivets, slip locks, or Velcro.® Preferred methods of connection include stitching or sewing. Sections of any of several straps may fold back along their own lengths before stitching to increase the strength and durability of connections.

Figure 3:
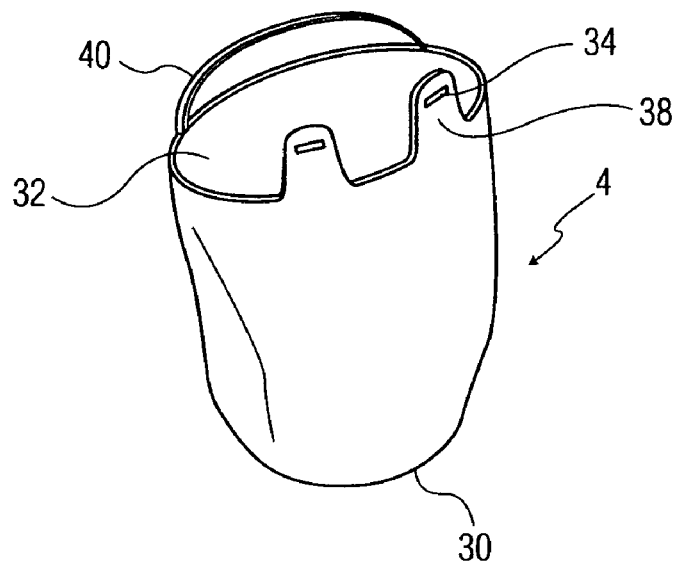
FIG. 3 shows an embodiment of the collection container of the invention.
Figure 4:
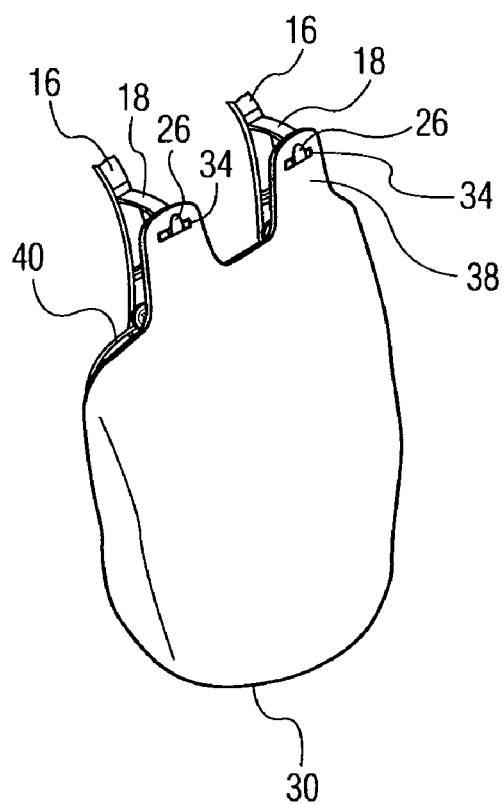
FIG. 4 illustrates attachment of an embodiment of the collection container to an embodiment of the harness.

FIG. 3 shows collection container 4, which receives the animals feces. Collection container 4 is preferably of a fluid impervious material to avoid leakage or seepage. A preferred material is a polymer film such as polyethylene or similar inexpensive but fluid tight material. Collection container 4 may take many forms, such as a rigid bottle contoured to fit an animal, but is preferably an elongated flexible bag with an opening defining mouth 32 at one end and an opposite closed end 30. Mouth 32 may be formed with integral loops 34 configured to engage hooks 26 on harness 3. Hooks 26 simply clasp collection container 4 to harness 3. This advantageously allows easy attachment an removal of collection container 4 from harness 3. Loops 34 may be distributed about mouth 32 so that, when hooks 26 engage loops 34, mouth 32 is held in an open configuration, as illustrated in FIG. 4.

In some embodiments, mouth 32 may connect to tabs 38. Tabs 38 may extend from mouth 32 to separate loops 34 from mouth 32. This separation advantageously disposes collection container 4 to avoid interference from protuberant portions of the animal's anatomy.

Alternatively, or in addition, collection container 4 may incorporate strings 40 attached to collection container 4. Strings 40 are preferably arranged around mouth 32 and provide attachment points for hooks 26 and secondary fasteners 27. Strings 40 may attach to collection container 4 by any of a number of methods including stitching, adhesive, or retention within a heat sealed channel. Strings 40 may have the added function of acting as drawstrings to close collection container 4 upon removal from harness 3.

Collection container 4 is preferably opaque and may incorporate deodorizing or sanitizing materials. In use, collection container 4 depends below the animal's tail to avoid discomfort to the pet. Preferably, collection container 4 is sized to so that it will not drag on ground. Mouth 32 is oriented to face the animal's anus when the collection container 4 is mounted to harness 3. This orientation advantageously causes feces to drop toward the bottom of collection container 4. Collection container 4 thus may contain the feces in its lower portion, reducing the likelihood of contact while removing and discarding collection container 4. Collection container 4 may also incorporate features that may help to close off mouth 32 after removal.

As domestic dogs vary in size more than most other animals, the invention includes features to adjust for the fit of the harness to the animal. Even so, the variations in dog body size are so great that no amount of adjustability is likely to encompass both, for example, a chihuahua and a English mastiff. The invention may include several sizes of harnesses and each size may include adjustments to fit to an individual animal. The use of several size of harnesses has the benefit of allowing users to select the size best fitted to their pet, while the adjustability features allow more precise fitting to the animal's anatomy.

The invention may include different size collection containers designed to accommodate animals of different capacity and caliber. Users may select among the differently sized collection containers independently of the harness size. This has the benefit of not hindering an animal's gait if a pet has, for example, a large body size requiring a large harness but short legs that may cause a large collection container to drag on the ground.

While the foregoing is directed to certain preferred embodiments of the present invention, other and further embodiments of the invention may be devised without departing from the basic scope of the invention. Such alternative embodiments are intended to be included within the scope of the present invention. Moreover, the features of one or more embodiments of the invention may be combined with one or more features of other embodiments of the invention without departing from the scope of the invention.

The terms and expressions in the Summary and the Detailed Description are terms of description and not of limitation. Recognizing that various modifications are possible within the scope of the claimed invention, the inventor has no intention in the use of such terms and expressions of excluding equivalents of the features shown and described or of portions of those features.

All patents, patent applications, and publications mentioned above are incorporated by reference in their entirety for all purposes. The inventor does not admit that any of these are prior art.

I claim:

1. A device to collect waste from an animal, the device comprising:
    an abdominal strap to encircle the animal's torso;
    a first descending strap having an first upper end, a first lower end, and a first hook, the first hook connected intermediate the first upper end and the first lower end, and the first upper end connected to the abdominal strap wherein the first descending strap further includes a first spring strip having a first strip end and a second strip end, the first strip end and the second strip end coupled to separated positions on the first descending strap to form a first half-loop, the first hook disposed on the first spring strip;
    a second descending strap having an second upper end, a second lower end, and a second hook, the second hook connected intermediate the second upper end and the second lower end, and the second upper end connected to the abdominal strap;
    a first elastic band directly connecting the first lower end to the abdominal strap; and
    a second elastic band directly connecting the second lower end to the abdominal strap,
    wherein, when the device is mounted to an animal, the first descending strap and the second descending strap are configured to dispose on either side of the animal's anus.

2. The device of claim 1 further comprising a tail strap connecting the first upper end to the second upper end, wherein, when the device is mounted to an animal, the tail strap is configured to dispose above the animal's tail.

3. The device of claim 1 wherein the second descending strap further includes a second spring strip coupled to the second descending strap to form a second half-loop, the second hook disposed on the second spring strip.

4. The device of claim 3 wherein the first elastic band has elastic compliance of greater than 20% and the first descending strap has elastic compliance of less than 20%.

5. The device of claim 4 wherein the first elastic band has elastic compliance of greater than 50%.

6. A device to collect waste from an animal, the device comprising:
    a waste container to contain the waste, the waste container including an open end and a closed end, the open end having first and second loops;
    a harness to secure and position the waste container with respect to the animal, the harness including:
    an abdominal strap to encircle the animal's torso;
    a first descending strap having an first upper end, a first lower end, a first spring strip, and a first hook, the first spring strip having opposed first strip ends, the first strip ends attached to separated positions on the first descending strap, the first spring strip flexed between the attached first strip ends to form a first half-loop, the first hook disposed on the first spring strip, and the first upper end connected to the abdominal strap;
    a second descending strap having an second upper end, a second lower end, a second spring strip, and a second hook, the second spring strip having opposed second strip ends, the second strip ends attached to separated positions on the second descending strap, the second spring strip flexed between the attached second strip ends to form a second half-loop, the second hook disposed on the second spring strip, and the second upper end connected to the abdominal strap, wherein the first loop is configured to removably engage the first hook and the second loop is configured to removably engage the second hook.

7. The device of claim 6 wherein the harness further includes a first elastic band removably connecting the first lower end to the abdominal strap and a second elastic band removably connecting the second lower end to the abdominal strap.

8. The device of claim 7 wherein the first elastic band has elastic compliance of greater than 80% and the first descending strap has elastic compliance of less than 10%.

9. The device of claim 6 further comprising a tail strap connecting the first upper end to the second upper end, wherein, when the device is mounted to an animal, the tail strap is configured to dispose above the animal's tail and the first descending strap and the second descending strap are configured to dispose on either side of the animal's anus.

10. The device of claim 1 further comprising a waste container configured to removably connect to the first and second hooks, the waste container comprising an elongated flexible bag including an open end and a closed end, the open end having first and second loops, the first loop configured to couple to the first hook and the second loop configured to connect to the second hook.

11. The device of claim 10 further comprising first and second tabs extending from the open end, the first loop disposed on the first tab, the second loop disposed on the second tab.

12. The device of claim 11 further comprising a string coupled to the elongated flexible bag adjacent to the open end.

13. The device of claim 12 wherein the elongated flexible bag includes a heat sealed channel adjacent the open end and wherein the string is retained within the heat sealed channel.

14. The device of claim 1 wherein the first descending strap includes first secondary fastener displaced spatially from the first hook and the second descending strap includes second secondary fastener displaced spatially from the second hook.

* * * * *